United States Patent [19]

Lee et al.

[11] Patent Number: 5,756,032

[45] Date of Patent: May 26, 1998

[54] PROCESS FOR THE PREPARATION OF BIAXIALLY EXTENDED POLYESTER FILM

[75] Inventors: Kwang-Hyung Lee, Suwon-si; Seung-Soo Woo, Kwacheon-si, both of Rep. of Korea

[73] Assignee: SKC Limited, Kyungki-do, Rep. of Korea

[21] Appl. No.: 763,993

[22] Filed: Dec. 12, 1996

[30] Foreign Application Priority Data

Dec. 13, 1995 [KR] Rep. of Korea ............... 95-49291

[51] Int. Cl.$^6$ ............... B29C 49/08; D01D 5/12; C08K 3/08
[52] U.S. Cl. ............... 264/210.7; 528/275; 528/282; 528/302; 524/779; 524/786; 524/788; 524/789; 428/357; 428/402
[58] Field of Search ............... 528/275, 282, 528/302; 524/779, 786, 788, 789; 428/357, 402; 264/210.7

[56] References Cited

U.S. PATENT DOCUMENTS

| | | | |
|---|---|---|---|
| 5,188,891 | 2/1993 | Takeda et al. | 428/323 |
| 5,304,324 | 4/1994 | Yoneda et al. | 252/309 |
| 5,306,538 | 4/1994 | Kurihara et al. | 428/141 |
| 5,316,714 | 5/1994 | Yoneda et al. | 264/210.6 |
| 5,434,000 | 7/1995 | Konagaya et al. | 428/329 |

*Primary Examiner*—Samuel A. Acquah
*Attorney, Agent, or Firm*—Anderson Kill & Olick, P.C.

[57] ABSTRACT

A biaxially extended polyester film comprising light calcium carbonate particles, spherical silica particles and γ- or δ-alumina particles or a mixture thereof treated with a silane coupling agent prepared by the inventive process possesses excellent surface and physical properties.

3 Claims, No Drawings

PROCESS FOR THE PREPARATION OF BIAXIALLY EXTENDED POLYESTER FILM

FIELD OF THE INVENTION

The present invention relates to a process for the preparation of a biaxially extended polyester film having excellent surface and physical properties.

BACKGROUND OF THE INVENTION

Polyesters such as polyethylene terephthalate (PET) are known to possess good chemical stability, physical and mechanical strength, durability, heat resistance, chemical resistance, weather resistance and electrical insulation property; and, therefore, have been widely used in manufacturing various articles including medical devices, capacitors, packaging and labelling materials, photographic film and magnetic recording media.

In general, it is well known that the physical properties such as the slip property and abrasion resistance of a polyester film greatly influences the processability, running property and quality of the film. Polyester films having embossed surface are often prepared so as to improve such properties of the film. The embossing can be typically formed by incorporating inert particles such as particles of calcium carbonate, silica and kaolin into the raw materials during the production of the film, or by forming inorganic particles in situ.

However, such use of inorganic particles have the disadvantages that light calcium carbonate particles tend to wear out easily due to their low hardness, and when a film containing them is used as the base film of a video tape, it is easily scratched, e.g., by a guide roll during a magnetic layer coating process thereof and by a calendering roll during a calendering process. The scratching of the base film may cause the drop-out phenomena of the magnetic tape.

As an attempt to solve such problems, Japanese Patent Laid-open Publication No. 214734/1990 discloses the use of light calcium carbonate particles and α-, γ- or δ-alumina particles to enhance the scratch resistance of a polyester film. Further, Japanese Patent Laid-open Publication No. 151231/1992 describes the use of a mixture of light calcium carbonate particles and a colloidal silica to impart scratch and abrasion resistance to a polyester film.

However, the use of alumina particles brings out the problems that a stable slurry containing a high alumina content is difficult to prepare and the life time of a filter used in a polymerization reactor becomes shortened, due to the thickening effect of the alumina particles.

SUMMARY OF THE INVENTION

It is, therefore, a primary object of the present invention to provide a biaxially extended polyester film having excellent surface and physical properties, by way of treating alumina particles with a silane coupling agent in a glycol to obtain a glycol slurry of treated alumina particles and directly using the slurry together with calcium carbonate particles and spherical silica particles in subsequent polycondensation reaction of a polyester monomer transesterified.

In accordance with one aspect of the present invention, there is provided a biaxially extended polyester film comprising 0.01 to 4.0 wt %, based on the weight of the polyester, of light calcium carbonate particles having an average diameter ranging from 0.01 to 3 μm, 0.01 to 4 wt % of spherical silica particles having an average diameter ranging from 0.1 to 1.0 μm and 0.01 to 4 wt % of γ- or δ-alumina particles or a mixture thereof having an average diameter ranging from 0.005 to 3 μm and a Mohs hardness of 6 or more, wherein said alumina particles are pretreated with 0.05 to 5 wt %, based on the amount of alumina particles employed, of a silane coupling agent of formula (I):

wherein,
R$^1$ is an organic functional group such as a methacryl

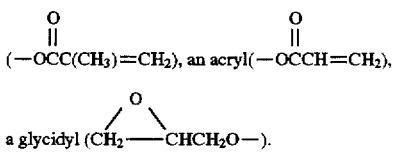

or an amino (—NR'$_2$) group, each R' being independently hydrogen or an alkyl group;
R$^2$ is a C$_{1-5}$ alkylene group; and
R$^3$ is a C$_{1-3}$ alkyl group.

In accordance with another aspect of the present invention, there is provided a process for preparing a biaxially extended polyester film which comprises transesterifying and polycondensing a monomer mixture for the preparation of a polyester resin, melt-extruding the polyester resin to form a sheet and biaxially extending the sheet to produce the polyester film, wherein a glycol slurry of γ- or δ-alumina particles or a mixture thereof having an average diameter ranging from 0.005 to 3 μm and a Mohs hardness of 6 or more which are pretreated with 0.05 to 5 wt % of the silane coupling agent of formula (I), light calcium carbonate particles having an average diameter ranging from 0.01 to 3 μm and spherical silica particles having an average diameter ranging from 0.1 to 1.0 μm are introduced as slip agents to the product of the transesterification step at a temperature ranging from 170° to 193° C.

DETAILED DESCRIPTION OF THE INVENTION

A polyester resin which may be used to prepare the polyester film of the present invention is produced by a process which comprises transesterifying and polycondensing a dialkyl ester of an aromatic dicarboxylic acid and an aliphatic glycol. The transesterification and polycondensation reactions may be carried out using batch or continuous processes, while a direct, one-step polymerization may also be used for the preparation of the polyester resin.

Representatives dialkyl esters of aromatic dicarboxylic acids which may be used in preparing a polyester resin in accordance with the present invention include: dialkyl esters of terephthalic acid, isophthalic acid, naphthalenedicarboxylic acid, cyclohexanedicarboxylic acid, diphenoxyethanedicarboxylic acid, biphenyldicarboxylic acid, diphenyl ether dicarboxylic acid, anthracenedicarboxylic acid and α,β-bis (2-chlorophenoxy)ethane- 4,4'-dicarboxylic acid, and others. Among them, dimethyl terephthalate are most preferred.

Exemplary aliphatic glycols which may be used in the present invention include: ethylene glycol, trimethylene glycol, tetramethylene glycol, pentamethylene glycol, hexamethylene glycol and hexylene glycol, and others. Among them, ethylene glycol is most preferred.

A preferred polyester for use in the present invention includes at least 80 wt % of ethylene terephthalate repeating units, the remainder being copolymeric repeating units derived from other dicarboxylic acids or oxycarboxylic acids as well as other diols. Such dicarboxylic acids and oxycarboxylic acids include: isophthalic acid, p-β-hydroxyethoxybenzoic acid, biphenyldicarboxylic acid, 4,4'-dicarboxylbenzophenone, adipic acid, sebacic acid, sodium 3,5-di(hydroxycarbonyl)benzene sulfonate, p-oxybenzoic acid and the like; and said other diols include: neopentyl glycol, diethylene glycol, cyclohexane dimethanol and the like.

The transesterification catalyst which can be used in the present invention may be any one conventionally used in the art such as sodium, manganese, potassium, lithium, calcium, magnesium, barium, zinc, zirconium, cobalt, aluminum and cadmium compounds, and a mixture thereof.

The polycondensation catalyst which can be used in the present invention may be any one conventionally used in the art such as titanium, germanium, tin, antimony, zinc, cobalt, aluminum, lead, manganese and calcium compounds, and a mixture thereof.

The light calcium carbonate particles used as a slip agent in the present invention has an average diameter ranging from 0.01 to 3.0 μm, preferably from 0.02 to 2.0 μm; and may be used in an amount ranging from 0.01 to 4 wt %, preferably 0.05 to 2.0 wt %, based on the weight of the polyester.

Spherical silica particles which are employed to increase running property of the polyester film has an average particle diameter ranging from 0.1 to 1.0 μm, preferably from 0.15 to 0.7 μm; and, may be employed in the present invention in an amount from 0.01 to 4 wt %, preferably 0.05 to 2.0 wt %, based on the weight of the polyester.

Further, γ- or δ-alumina particles or a mixture thereof to be used in the present invention has an average particle diameter ranging from 0.005 to 3 μm, preferably from 0.01 to 1.5 pm, and a Mohs hardness of 6 or more; and may be employed in an amount ranging from 0.01 to 4 wt %, preferably from 0.05 to 2 wt % based on the weight of the polyester.

The silane coupling agent, which is used for the treatment of the alumina in the present film, has a structure of formula (I):

$$R^1-R^2-Si-(OR^3)_3 \quad (I)$$

wherein,
$R^1$ is an organic functional group such as a methacryl

(—OCC(CH$_3$)=CH$_2$), an acryl (—OCCH=CH$_2$),

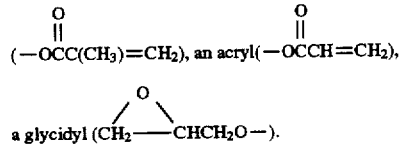
a glycidyl (CH$_2$——CHCH$_2$O—).

or an amino (—NR'$_2$) group, each R' being independently hydrogen or an alkyl group;
$R^2$ is a $C_{1-5}$ alkylene group; and
$R^3$ is a $C_{1-3}$ alkyl group.

The silane coupling agent preferred in the present invention is the compound of the formula(I) wherein $R^2$ is a propylene group and $R^3$ is a methyl or ethyl group.

In the present invention, the silane coupling agent may be added to an ethylene glycol slurry containing 20 to 60 wt % of alumina, in an amount ranging from 0.05 to 5.0 wt %, preferably from 0.1 to 5.0 wt % based on the weight of the alumina employed. The silane coupling agent may be preferably added to the ethylene glycol slurry, while stirring, at a temperature ranging from 30° to 180° C., preferably 30° to 120° C., and the resulting mixture is preferably maintained for a period ranging from 40 to 80 minutes, more preferably 50 to 70 minutes to treat alumina with the silane coupling agent.

The ethylene glycol slurry of the treated alumina particles is preferably introduced, together with calcium carbonate particles and spherical silica particles, to the product of the transesterification step at a temperature ranging from 170° to 193° C. If the temperature is lower than 170° C., the reaction proceeds slowly. Whereas if the temperature exceeds 193° C., aggregated particles become larger, thereby shortening the life time of the filter used in the reaction.

In addition to the slip agents described above, the polyester film of the present invention may also contain other common additives such as antioxidants, antistatic agents, heat stabilizers and dyes. Such additives may be added at any time during the preparation of the polyester, preferably during the transesterification step or immediately prior to the polycondensation step.

The biaxially extended polyester film of the present invention may be prepared as follows. A polyester resin, having a molecular weight of about 20,000 and containing the above-described alumina particles treated with silane coupling agent, spherical silica particles and calcium carbonate particles as well as other suitable additives, is melt-extruded into an amorphous cast sheet through a T-die, and the resulting sheet is subsequently quenched on a cold roll and then biaxially extended to produce a biaxially extended polyester film. At the biaxial extending step, the longitudinal and lateral extensions may be conducted at a temperature ranging from 60° to 150° C. in a draw ratio of 2.5 to 6.0.

The thickness of the biaxially extended polyester film may be controlled, depending on the final use of the film, typically in the range of 2 to 200 μm.

The following Examples are intended to illustrate the present invention more specifically, without limiting the scope of the invention.

In the Examples and Comparative Examples, the characteristics of the slip agents employed and the properties of the polyester films produced were evaluated in accordance with the following methods.

1. Average Particle Diameter

The average diameter of particles was measured as a volumetric average diameter in an ethylene glycol slurry by employing a centrifugation type granulometer (SA-CP2, Shimadzu in Japan).

2. Slurry Viscosity

The viscosity of an ethylene glycol slurry of slip agent particles was measured at a spindle speed of 60 rpm using B type viscometer (Brookfield in England) at room temperature.

3. Molecular Weight

The molecular weight of a polymer was measured by a molecular weight measuring apparatus (150C, Waters in U.S.A.) using m-cresol as the mobile phase at a flow rate of 1 ml/min. and at a column temperature of 100° C.

4. Slurry Stability 100 cc of an ethylene glycol slurry of slip agent particles was placed in a 100 ml volumetric cylinder and allowed to stand while observing the status of the slurry. The stability of the slurry was evaluated on the basis of the following criteria:

◎ (excellent): when no phase separation occurs within 7 days

○ (good): when phase separation occurs after 5 days

Δ (common): when phase separation occurs after 3 days
X (poor): when phase separation occurs after 1 days 5. Filter Life Time The number of batches which can be processed by a filter in a polymerization reactor for polymerizing a polyester resin was measured and the filter life time was evaluated on the basis of the following criteria:

⊚: When at least 50 batches are processed
○: When at least 30 batches are processed
Δ: When at least 10 batches are processed
X: When at least 5 batches are processed 6. Surface Smoothness The surface smoothness of a 30 mm×20 mm×15 μm polyester film sample was determined with a contact type surface roughness gauge (SURFCORDER SE-30D, Kosaka Institute in Japan).

Average Surface Roughness at Centerline($R_a$): Height of a line parallel to a mean line of a roughness curve where the areas of both sides of the line become equal.

Highest Height at Centerline($R_t$): Distance from the highest point to the lowest point within the area measured.

7. Abrasion Resistance

The abrasion resistance was determined by running a ½ inch-wide film sample against a guide pin of a running tester TBT-300D(Yokohama System Institute in Japan) at a running speed of 3.3 cm/sec, and observing visually or with a microscope, the degree of white powder formation on the surface of the guide pin.

The abrasion resistance was evaluated on the basis of the following criteria:

⊚:No white powder was formed on the surface of the guide pin.
○: Up to 20% of the surface of the guide pin was covered by a white powder.
Δ: Up to 50% of the surface of the guide pin was covered by a white powder.
X: The whole surface of the guide pin was covered by a white powder.

8. Scratch Resistance

The scratch resistance was determined by running a ½ inch-wide film sample over a running length of 90 m against a guide pin of a running tester with a surface roughness of 0.2S, at a contact degree (Θ) of 180° and a contact speed of 3.3 cm/minute, and at a temperature of 25° C. and a relative humidity of 60%, while controlling the inlet tension of the tester to 30 g. After two such runs, the film surface was examined with a microscope for damages caused by the guide pin.

The scratch resistance was evaluated on the basis of the following criteria:

⊚: 2 or less scratch lines were formed on the surface of the film.
○: 3 to 4 scratch lines were formed on the surface of the film.
Δ: 5 to 6 scratch lines were formed on the surface of the film.
x : 7 or more scratch lines were formed on the surface of the film.

9. Running Property

The running property was measured by running a ½ inch wide tape at 20° C. and at a relative humidity of 60% using a tape running tester (TBT-300D, Yokohama System Institute in Japan), and then calculating the initial running friction coefficient μk by using the following equation:

$$\mu k = 0.733 \log(T_{out}/T_{in})$$

wherein:

$T_{in}$ is a tension of the tape at the inlet of the tester; and
$T_{out}$ is a tension of the tape at the outlet of the tester.

<Running property at a high speed>

The running property of the film at a high speed was measured by rotating the guide pin either in the running or in the reverse direction, setting the winding angle of the film at 180° and then measuring the running friction coefficient at a speed of 50 cm/sec and at a tension of 300 g.

The running property at a high speed was classified on the basis of the following criteria:

⊚: $\mu k \leq 0.10$: excellent
○: $0.10 < \mu k < 0.20$ : good
Δ: $\mu k = 0.20$ :common
X : $\mu k > 0.20$ :poor Example 1

An ethylene glycol slurry containing 20 wt % of γ-alumina was prepared, and then the average particle size of γ-alumina was measured. The slurry was then heated to 60 OC and thereto was added $H_2N(CH_2)_3Si(OCH_2CH_3)_3$ as a coupling agent, in an amount of 0.3 wt % based on the amount of γ-alumina employed, to treat the surface of the γ-alumina for 55 minutes. The viscosity of the slurry thus obtained was measured.

Dimethyl terephthalate and ethylene glycol were mixed at a molar ratio of 1:2 and the resulting mixture was transesterified in the presence of zinc acetate. Introduced to 100 parts by weight of the resulting product at a reactor temperature of 180° C. were; 0.15 part by weight of the treated alumina particles in the form of ethylene glycol slurry obtained above, 0.30 part by weight of light calcium carbonate particles having an average diameter of 0.42 μm and 0.25 part by weight of spherical silica particles having an average diameter of 0.28 μm. Then, the resulting mixture was subjected to a polycondensation reaction in the presence of antimony trioxide to obtain a polyester resin having a molecular weight of approximately 20,000.

The polyester resin thus obtained was dried and melt-extruded to form a cast sheet. The sheet was stretched in a draw ratio of 3.0 in both longitudinal and lateral directions at 90° C. to provide a biaxially extended polyester film having a thickness of 50 μm. The properties of the film were measured and the results are shown in Table I.

Examples 2 and 3 and Comparative Examples 1 to 9

The procedure of Example 1 was repeated except that the component, the particle diameter and the amount of the additives were varied as shown in Table I.

The results of the measurements for the films thus obtained are shown in Table I.

TABLE I

| | | Additives | | | | | Properties of film | | | | | | |
|---|---|---|---|---|---|---|---|---|---|---|---|---|---|
| | | Slip Agent Used | | | | | | Surface Smoothness | | | | | |
| | Comp. | Aver. Par. Dia. μm | Amount wt % | Slu. Vis.* cps | Slu. Stab. | Molecular Weight Mn | $R_a$ μm | $R_t$ μm | A.R. | S.R. | F. | R. |
| Ex. 1 | C+S+γ | 0.42/0.28/ 0.20 | 0.30/0.25/ 0.15 | 75@ | ☉ | 18,900 | 0.021 | 0.325 | ☉ | ☉ | ☉* | ☉ |
| 2 | C+S+δ | 0.53/0.50/ 00.20 | 0.20/0.20/ 0.20 | 67@@ | ☉ | 18,800 | 0.022 | 0.345 | ☉ | ☉ | ☉## | ☉ |
| 3 | C+S+γ | 0.60/0.70/ 0.35 | 0.15/0.15/ 0.25 | 65@@@ | ☉ | 19,100 | 0.024 | 0.373 | ☉ | ☉ | ☉* | ☉ |
| Com. Ex. 1 | C | 0.40 | 0.30 | — | — | 17,700 | 0.021 | 0.364 | X | X | — | X |
| 2 | C | 0.54 | 0.20 | — | — | 17,800 | 0.023 | 0.100 | X | X | — | X |
| 3 | C | 0.65 | 0.15 | — | — | 17,900 | 0.028 | 0.475 | X | X | — | X |
| 4 | γ | 0.10 | 0.25 | 1500 | X | 18,600 | 0.018 | 0.288 | X | Δ | X### | Δ |
| 5 | γ | 0.20 | 0.20 | 1500 | X | 18,300 | 0.023 | 0.356 | X | Δ | X### | Δ |
| 6 | δ | 0.30 | 0.15 | 510 | X | 19,500 | 0.025 | 0.380 | X | Δ | X#### | ○ |
| 7 | C+δ | 0.40/0.10 | 0.30/0.25 | 510 | X | 18,400 | 0.027 | 0.432 | X | Δ | X### | Δ |
| 8 | C+S+γ | 0.53/0.50/ 0.20 | 0.20/0.20/ 0.20 | 1500 | X | 19,500 | 0.031 | 0.553 | X | ○ | X### | ○ |
| 9 | C+S+δ | 0.60/0.70/ 0.35 | 0.15/0.15/ 0.20 | 510 | X | 19,300 | 0.029 | 0.456 | X | ○ | X#### | ○ |

[Footnote]
C: Light calcium carbonate, γ: γ-alumina, δ: δ-alumina, S: spherical silica
*The alumina content of the slurry was 20 wt %.
$R_a$: Average surface roughness at centerline, $R_t$: Highest height at centerline
A.R.: Abrasion resistance, S.R.: Scratch resistance, R.: Running property
F.: Filter life time, @: $H_2N(CH_2)_3Si(OC_2H_5)_3$(0.3 wt %), @@: $CH_2=C(CH_3)COO(CH_2)_3Si(OCH_3)_3$ (0.4 wt %)
@@@: $CH_2CHCH_2O(CH_2)_3Si(OCH_3)_3$ (0.6 wt %)
: Alumina slurry was introduced at 170° C., ##: Alumina slurry was introduced at 193° C.
: Alumina slurry was introduced at 145° C., ####: Alumina slurry was introduced at 250° C.

As can be seen from the results in Table I, the films comprising alumina particles treated with a silane coupling agent, light calcium carbonate particles and spherical silica particles, prepared in accordance with the present invention, exhibit excellent surface and physical properties, and therefore, are useful in manufacturing various articles.

While the invention has been described with respect to the above specific embodiments, it should be recognized that various modifications and changes may be within the scope of the invention as defined by the claims the follow.

What is claimed is:

1. A process for preparing a biaxially extended polyester film comprising transesterifying and polycondensing a monomer mixture for the preparation of a polyester resin, melt-extruding the polyester resin to form a sheet and biaxially extending the sheet to produce the polyester film, wherein a glycol slurry of γ- or δ-alumina particles or a mixture thereof having an average diameter ranging from 0.005 to 3 μm and a Mohs hardness of 6 or more, light calcium carbonate particles having an average diameter ranging from 0.01 to 3 μm and spherical silica particles having an average diameter ranging from 0.1 to 1.0 μm are introduced to the product of the transesterification step at a temperature ranging from 170° to 193° C., the alumina particles being previously treated with a silane coupling agent of formula (I) in an amount of 0.05 to 5 wt % based on the alumina by adding the silane coupling agent to a stirred ethylene glycol slurry of the alumina at a temperature ranging from 30° to 180° C., and allowing the resulting mixture to stand for a period ranging from 40 to 80 minutes;

$$R^1-R^2-Si-(OR^3)_3 \quad (I)$$

wherein, $R^1$ is a methacryl

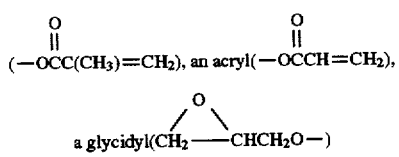

$(-OCC(CH_3)=CH_2)$, an acryl$(-OCCH=CH_2)$, a glycidyl$(CH_2-CHCH_2O-)$ or an amino group;

$R^2$ is a $C_{1-5}$ alkylene group; and $R^3$ is a $C_{1-3}$ alkyl group.

2. The process of claim 1 wherein the alumina particles, calcium carbonate particles or silica particles are employed in an amount ranging from 0.01 to 4 wt % based on the weight of the polyester resin.

3. The process of claim 1, wherein the silane coupling agent is selected from the group consisting of $H_2N(CH_2)_3Si(OC_2H_5)_3$, $CH_2=C(CH_3)COO(CH_2)_3Si(OCH_3)_3$ and

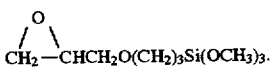

$CH_2-CHCH_2O(CH_2)_3Si(OCH_3)_3.$

* * * * *